Sept. 30, 1941. R. H. LAWSON ET AL 2,257,504
STRIPING DEVICE FOR KNITTING MACHINES
Filed July 2, 1937 9 Sheets-Sheet 4

INVENTORS:
ROBERT H. LAWSON,
AUGUSTIN GAGNE,
By Roy F. Lovell,
ATT'Y.

Sept. 30, 1941.    R. H. LAWSON ET AL    2,257,504
STRIPING DEVICE FOR KNITTING MACHINES
Filed July 2, 1937    9 Sheets-Sheet 5

FIG. 7.

INVENTORS:
ROBERT H. LAWSON,
AUGUSTIN GAGNE,
By Roy F. Lovell,
ATT'Y.

Sept. 30, 1941.    R. H. LAWSON ET AL    2,257,504
STRIPING DEVICE FOR KNITTING MACHINES
Filed July 2, 1937    9 Sheets-Sheet 6

INVENTORS
ROBERT H. LAWSON,
AUGUSTIN GAGNÉ,
BY Roy F. Lovell,
ATT'Y.

Sept. 30, 1941.　　R. H. LAWSON ET AL　　2,257,504
STRIPING DEVICE FOR KNITTING MACHINES
Filed July 2, 1937　　9 Sheets-Sheet 8

INVENTORS:
ROBERT H. LAWSON,
AUGUSTIN GAGNE,
BY Roy F. Lovell,
ATT'Y.

Patented Sept. 30, 1941

2,257,504

UNITED STATES PATENT OFFICE 2,257,504

STRIPING DEVICE FOR KNITTING MACHINES

Robert H. Lawson, Pawtucket, and Augustin Gagné, Central Falls, R. I., assignors to Hemphill Company, Central Falls, R. I., a corporation of Massachusetts Application July 2, 1937, Serial No. 151,722

14 Claims. (Cl. 66—140)

This invention has reference to knitting machines and more particularly to knitting machines adapted to knit fabric wherein yarn changes take place periodically for the purpose of horizontal striping or other ornamentation of a like nature. The invention is described with reference to an independent needle knitting machine of the circular type, although not necessarily limited thereto, and may be employed in the knitting of fabrics of all sorts and in the knitting of all types of hosiery.

The ornamentation of knitted fabrics by means of so-called horizontal striping has been practiced for many years and simple devices for accomplishing this purpose are well-known. One of the purposes of this case is to provide control for the yarn change to effect horizontal striping in accordance with almost any pattern desired. The changes may be effected at every course, or at intervals of any number of courses up to a maximum provided, and the number of courses between which changes of striping occur may be varied with the same color or colors throughout the length of the fabric. Thus it is not necessary to repeat the different colored strips at any particular intervals nor is it necessary with this striping means to make each stripe or any particular stripe of any length, except within limits provided as extremes by the scope of the particular pattern means itself.

Along with the practically universal control for the yarn changes to effect striping of varied characters, we have provided automatic control for the binder and cutter which functions at each change and is controlled in accordance with the striping pattern itself. That is, every time the pattern is reset so as to obtain a different striping effect in the fabric, it is not necessary to make changes in the control for the binder and cutter; the change in striping pattern automatically provides for correct timing of the binder and cutter so that its operation will follow the sequence of yarn changes in the machine thus making it unnecessary for the knitter to concern himself with more than setting up of the pattern to produce a desired arrangement of striping whereupon proper operation of the binder will result.

The mechanism herein disclosed will be described with respect to a hosiery machine, but it is to be understood that we are by no means limited to hosiery machines and it is contemplated to employ the principles of the invention in all types of knitting machines wherein yarn change may be desirable and/or wherein it may be desirable to control a binder and cutter in accordance with the yarn changing function, or in accordance with any other function of the machine which would make it desirable variably to control these very important and desirable elements. The invention herein disclosed embodies a simple form of mechanism adapted to provide the knitter with a number of varying patterns which he may knit at will, and again, with a more comprehensive pattern control which will provide changes and possibility of striping effects which are practically unlimited in scope.

Now referring to Figs. 1–6, a simple form of pattern mechanism is illustrated wherein several different pattern effects may be produced at will by a manual change from one pattern disc to another. A typical hosiery machine of the Banner type is illustrated wherein the so-called circular base has been shown at 1, a latch ring at 2 hinged on the usual latch ring post 3. This latch ring is extended at 4 and provides a pivot 5 upon which are mounted to swing a series of yarn levers herein shown as five in number. It is, of course, possible to employ fewer or a greater number of yarn guiding fingers depending upon the number of colors which it is desired to work with and further, depending upon how many other yarns (non-striping yarns) it is desired to use. In this particular illustration we are employing three fingers for feeding colored striping yarns, these fingers being designated by numerals 6, 7 and 8. The other fingers may be employed for feeding a heel and toe yarn, reinforcing yarns, or the like. A yarn binder herein designated at 9, and which will be described in greater detail later, is mounted in the usual way on the latch ring and projects downwardly to occupy a position within the needle circle as is common on Banner machines. This binder is operated by the usual binder control so that it will function at desired times throughout the knitting of an ordinary stocking, that is, a stocking not striped, and the special devices herein described and comprising an essential part of the invention function during striping only, to assure the binding and cutting of the patterning yarns in accordance with changes thereof.

Figure 1:
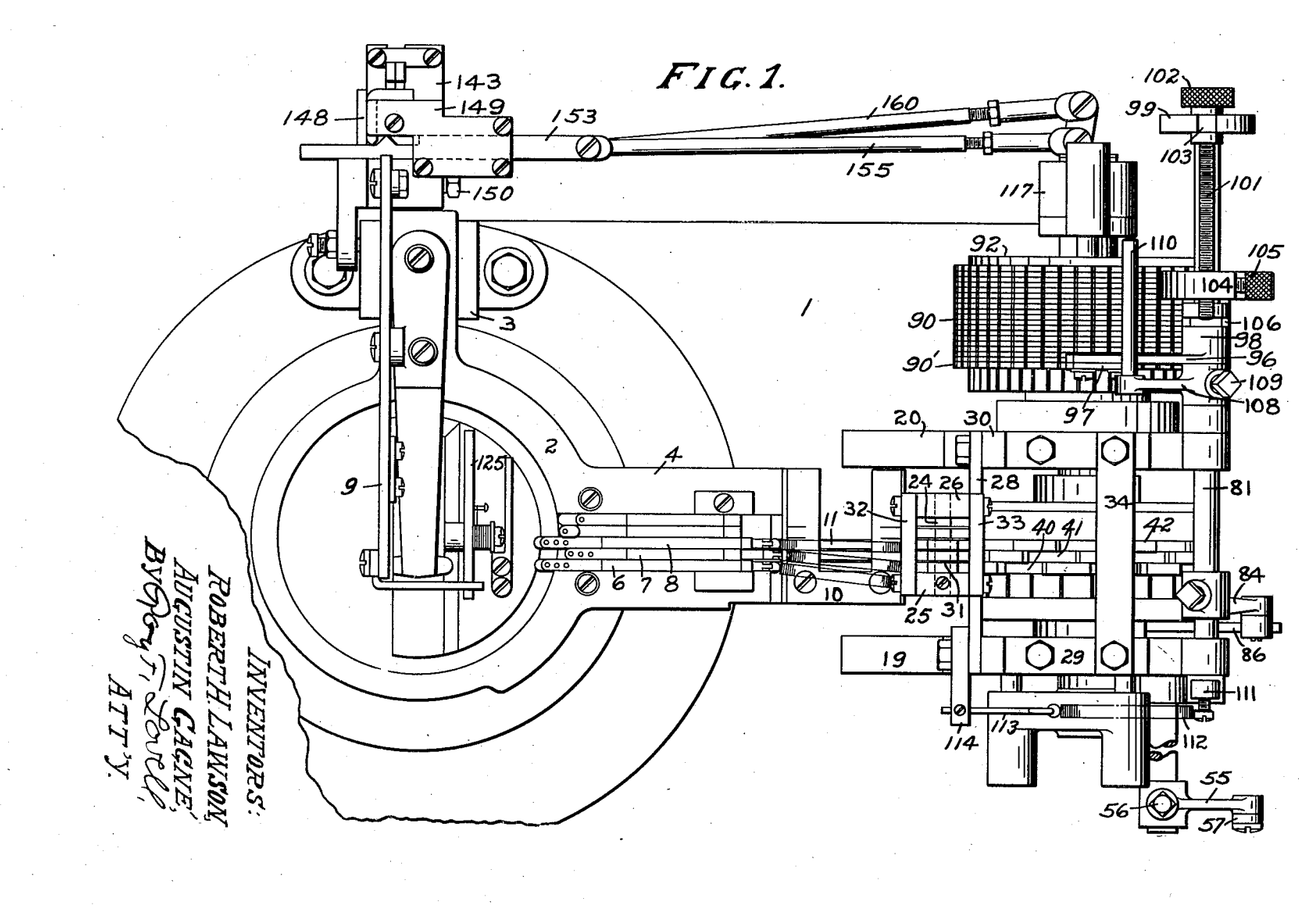
Fig. 1 is a plan showing a simple form of the mechanism adapted to control the feeding of different striping yarns and to regulate the operation of the clamp and cutter.
Figures 2, 3:
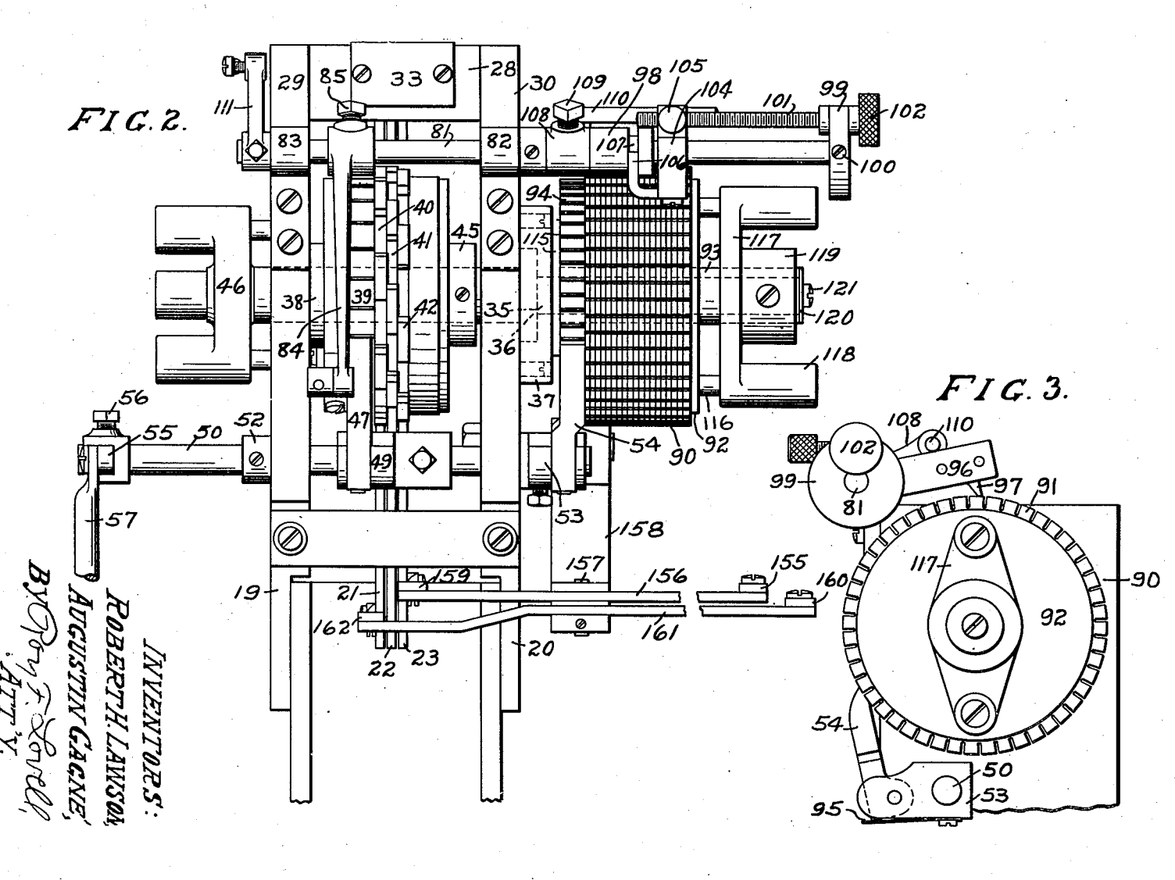
Fig. 2 is a side elevation of part of the mechanism of Fig. 1 to an enlarged scale and in greater detail.
Fig. 3 is an elevation taken at one end of the striper controlling mechanism and showing those parts as seen from the right hand end of Fig. 2.
Figures 4, 5:
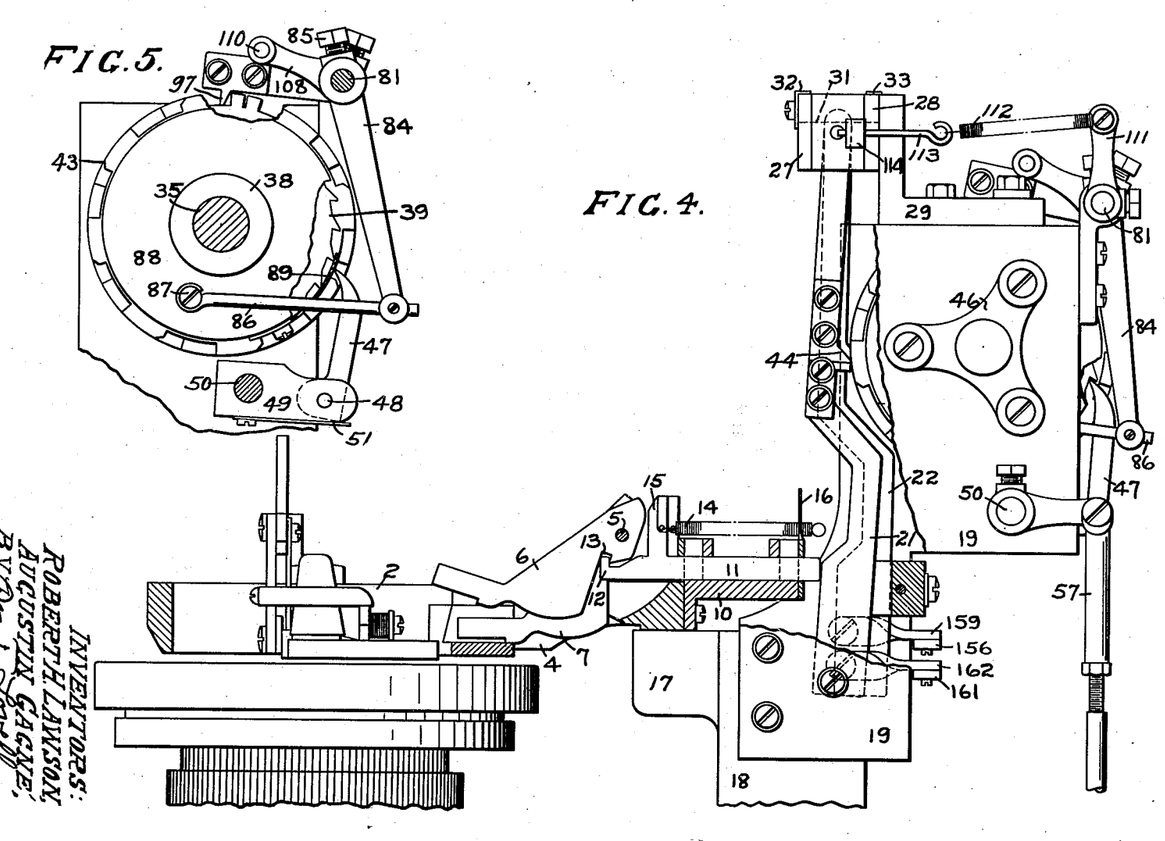
Fig. 4 is a section showing the cylinder head, latch ring, yarn guides and the striper controlling connections which convey motion to these yarn guides in accordance with changes of pattern.
Fig. 5 is a section showing in detail the ratchet control for certain cams which control the function of the striping yarn guides.

The extension to the latch ring has an additional bracket 10, Figs. 1 and 4, within which are slidably mounted a series of plungers 11 equal in number to the number of fingers which are to be employed for striping. In this particular example three plungers are employed, one plunger functioning with each guide 6, 7 and 8. These plungers have at their front ends a projection 12 which fits within a notch 13 cut in the back of each yarn guiding finger and beneath the pivot 5 so that sliding movements imparted to a plunger will cause a rocking of its particular finger about that pivot. Each plunger has a spring 14 connected at one end to the upwardly extending part 15 adjacent the forward end of the plunger, and at the other end that spring is held within a comb 16 attached in turn to the bracket 10. Each of these springs 14 may be adjusted as to tension by inserting the spring at any desired coil thereof down between the teeth of the comb whereupon it will be held in that position. The construction is such that under the tension of the springs 14 plungers will be drawn to the right Figs. 1 and 4, and will always tend to move yarn guiding fingers 6, 7 and 8 to a position in which they would feed their respective yarns to the knitting needles. In these figures guide 7 is shown being drawn to such a position but guides 6 and 8 have been moved by the striper control mechanism and against the tension of springs 14 to a position in which they will not feed yarns to the needles but will have their yarns taken within the binder and cutter. The extension 4 rests upon a lug 17 at the upper end of the yarn control lever box 18, this control lever box being of conventional construction and having therein the usual mechanism for control of the non-striping yarns, all as shown in prior patents showing Banner machines.

At the back of the machine and mounted on suitable brackets or extensions 19 and 20 attached by means of suitable screws or the like to the box 18, is the striper controlling mechanism which in this example of the invention comprises a series of pattern discs, any one of which may be selectively employed to control the ratcheting of a series of cams equal in number to the number of striping fingers, these pattern discs being variable according to any desired pattern which it is desired to knit by the control of the striping yarns. Three levers 21, 22 and 23 depend from a pivot 24 at the upper end of the machine and are aligned with the plungers 11 so that one of these levers controls each of the plungers.

The pivot 24 is held within a box-like structure comprising end pieces 25 and 26 and sides 27 and 28. The side 28 is longer than the front piece 27 and is bolted to upright, angular brackets 29 and 30 which are in turn permanently attached to the elements 19 and 20. Each of the levers 21–23 is maintained in separated position by one of several strips 31, these strips being inserted within slots cut vertically within the elements 27 and 28, and are held in place by means of the cap pieces 32 and 33, see Figs. 1 and 4. A tie rod 34 also serves in conjunction with the element 28 to maintain the supporting brackets 19 and 20 rigidly in position.

A spindle 35 passes through the central portion of the brackets 19 and 20 and is free to turn in bearings therein. This spindle has a collar 36 integral therewith which is held in position against one side of the bracket 20 by means of a retaining element 37 which is recessed or counterbored to receive the collar 36 and which is permanently secured against the side of said bracket. The collar is free to turn within this retaining element but prevents axial movement of the spindle for reasons which will be explained in due course. Between the upright brackets 19 and 20 a hub 38 is keyed to the spindle or in any other suitable way secured thereto so as to turn with the spindle, this hub carrying a ratchet wheel 39 and three plates 40, 41 and 42, each of which plates has a series of cams thereon. These cams are herein shown as eight in number in each plate and are beveled as shown at 43 to engage a follower 44, one of which is provided on each of the levers 21–23, these followers on the levers aligning with their respective cams. The construction is such that the cams on these cam plates 40–42 are staggered in alignment so that it can generally be stated that while one follower is always off its cams to allow its yarn guide to fall to feeding position, the other followers will be raised on their cams to move their respective yarn guides to a non-feeding position. However, it is desirable that before a feeding yarn guide is moved from feeding relationship to the needles that the next functioning guide be moved to position so as to cause a small overlap. This is accomplished by an overlapping of the cams on the respective plates so that one follower 44 will dwell in position for the correct interval after the other follower 44, whichever one may be next to operate, has dropped from its cam. By proper overlapping of the cams it is possible to secure an overlap of the striping yarns throughout any desired number of needles, but of course, only a few needles are necessary for this purpose.

The hub 38 abuts against a collar 45 which is adjustable as to position along the spindle. At the end of spindle 35 a frictioning means has been attached which comprises the usual plungers maintained within a spider 46 and which plungers are spring pressed outwardly to create a friction or resistance as the spider which is attached to the spindle rotates. These plungers bear against the side of bracket 19 and the resistance created is sufficient to hold the spindle and all attached parts rigidly in position except when they are ratcheted by means of pawl 47 which is continuously reciprocated to impart a single tooth movement to the ratchet wheel 39 once for every revolution of the knitting machine unless otherwise controlled.

Figure 9:
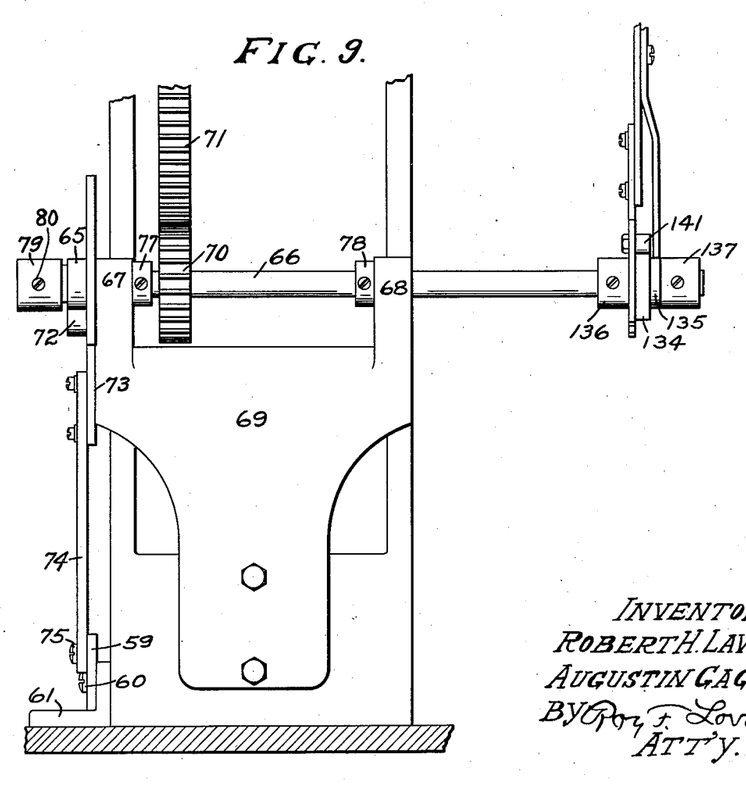
Fig. 9 is a view taken at the back of the machine, partly in section, and showing the drive for the striper ratcheting mechanism and the binder and cutter controlling and actuating means.

The pawl 47 is pivoted at 48 in the forked end of a short lever 49 in turn fixed to a short spindle or shaft 50. This pawl is urged into engagement with the teeth of ratchet wheel 39 by means of a leaf spring 51, all as shown in Fig. 5. The shaft or spindle 50 passes through bearings in the bracket 19 and 20 and is maintained in position by a collar 52 and a second arm or lever 53 fixed by means of a set screw or by any other attaching means to the inner end of the spindle. This lever 53 is similar to the lever 49 and carries a second pawl 54 the function of which will be explained in one of the following paragraphs. The spindle 50 has a short lever 55 fixed by means of a set screw 56 to its outer end and this lever has attached thereto a downwardly projecting link 57 which is in turn connected at its lower end at 58 to one end of a rocking lever 59 pivoted at 60 to a bracket 61 fixed to any convenient part of the frame of the machine. A spring 62 is attached at 63 to the opposite end of lever 59 and to the frame at 64. This spring is under considerable tension and moves the entire operating mechanism for rocking the pawl carrying spindle 50 in one direction. A cam 65 fixed to a shaft 66 imparts movement in the opposite direction. As shown in Fig. 9, this shaft 66 passes through suitable bearings 67 and 68 in a bracket 69 at the rear of the machine. The spindle carries fixedly attached thereto a pinion 70 which meshes with the 104 tooth gear 71 and is of such a size as to provide one revolution of the shaft 66 for every rotation of the needle cylinder of the machine. The cam 65 contacts a roller or other type of follower 72 on the upper end 73 of a two part link, the other end 74 of which is attached at 75 to lever 59. The two parts 73 and 74 are so connected that they are slidably adjustable so as to compensate movements of the mechanism which is controlled therefrom. The upper end 73 is slotted at 76 and this slot serves to guide the said link and follower as it engages about shaft 66. The shaft is maintained in position by collars 77 and 78, each adjustable along the length of the shaft. The cam 65 extends outwardly in an enlarged hub 79, which hub also serves to fix the cam to the shaft by means of a set screw 80.

With so much of the mechanism as has been described to this point, each revolution of the needle cylinder of the machine would be accompanied by a ratcheting movement of spindle 35 and the attached cams on plates 40—42 throughout one tooth of the ratchet wheel 39. In the construction shown the ratchet wheel 39 carries twenty-four teeth, although it is to be understood that this number is not necessarily controlling but is merely one example of a satisfactory construction. If no other control were available, at each ratcheting movement one of the yarn levers 6—8 would be raised from position and another would drop into position so that single course stripes would be made continuously. These stripes would alternate in colors as the yarn levers were dropped to position, there being twenty-four stripes for each revolution of the spindle 35, these 24 stripes being divided into three colors alternating in a continuous sequence such as red, black, white, these being repeated eight times. Of course, at the next rotation and at those subsequent, the same 24 courses would be repeated.

Referring to Figs. 1–5, a second spindle 81 is rotatably carried within bearings 82 and 83. This spindle has a depending lever 84 which is attached fixedly to the spindle by means of a set screw 85. The lower end of lever 84 has link 86 connected thereto, the other end of the link being connected about a pin 87 threaded into plate 88 which is carried for free rotation about the hub 38. This plate 88 has a curved strip 89 attached so that said strip overlaps the teeth of the ratchet wheel 39 and can be moved to and from a position beneath the pawl 47. This plate 89 acts as a bluffer for the pawl 47 whenever it is moved by means of the lever 84, connecting link 86 and other mechanism turning the plate 88 in a counter-clockwise direction, Fig. 5.

The spindle 81, lever 84, etc., is moved in accordance with a pattern set up on one of several pattern discs, generally indicated at 90. These pattern discs include a plurality of butts 91 which are frangible or otherwise removable; in this particular instance each disc has 48 separate butts thereon, but it is to be understood that a disc may be provided with any desirable number of butts and that the pattern possibilities will merely be decreased or increased over what is shown in this particular example. None of the butts have been shown as removed in these figures, although it is essential that some should be removed for varying the pattern and in actual practice many of the butts would be left on these discs while others would be removed, one particular example being shown in Fig. 22 which will be described in detail later. These discs are mounted on a hub 92 which is in turn carried on a sleeve 93 formed as an extension of the element 37, Fig. 2. The discs are keyed or otherwise held from rotation on the hub 92, but the hub itself is free to rotate on said sleeve. A ratchet wheel 94 having 48 teeth is attached at the other end of the hub, or at the other side of the group of discs, and is adapted to be engaged by pawl 54. This pawl 54 is carried in the forked end of the arm 53 and is held in engagement with the ratchet wheel by means of spring 95 similar to the spring 51 described with respect to pawl 47. It will be noted that the arm 53 is shorter than arm 49, and also both are reciprocated by the rocking movements of the spindle 50, the longer movement provided for pawl 47 allows it to engage the teeth of ratchet wheel 39 which are spaced twice the distance of the teeth on ratchet wheel 94. At each reciprocation of the pawls either one will engage a single tooth on its respective ratchet wheel.

The spindle 81 supports a lever 96 having a follower 97 attached thereto, the hub 98 of said lever being freely movable about the spindle. This follower 97 engages upon the butts of one disc in the group 90 in the particular illustration shown, the disc 90' at the very end being the particular one which is engaged. The spindle 81 projects to the right, Figs. 1 and 2, and has a collar 99 fixed by means of a set screw 100 at the outer end. An elongated screw 101 having a knurled head 102 is formed with a recess or groove at 103 which engages within a slot cut at the outer edge of the collar itself. A second collar 104 of similar size is freely slidable on spindle 81 and is threaded to receive the screw 101. A set screw 105 is provided for locking these elements in position when the collar 104 has been adjusted to some particular place along spindle 81. The collar 104 carries an angular piece 106 which is so shaped as to engage part way around a groove or undercut portion 107 in the hub 98. By means of this mechanism the hub 98 and lever or arm 96 may be moved along the spindle and at the same time the follower 97 will be moved along to engage with any desired one of the discs in the group 90. Any suitable number of discs may be set up in this group, there being 19 discs herein shown. It is to be understood that each of these discs may have a different pattern set up thereon and by means of the knurled adjusting screw, the lever 96 can be set so that any one of the 19 patterns may be produced at will. Of course the discs are removable and if some other pattern is desired, one of the 19 discs may be substituted by another having the desired pattern. Movements of lever 96 as the follower 97 rides upon and drops from butts on this particular disc being engaged would merely swing that lever which is free to turn about the spindle. A second and adjoining lever 108 is fixed to spindle 81 by means of a set screw 109 and at its free end carries a pin 110 which bears upon the upper edge of lever 96. Thus it may be seen that whenever the lever 96 is moved upwardly this movement will be imparted through the lever 108 to spindle 81 and the connecting linkage will then function to move the bluffer plate 89 out from under pawl 47. The spindle 81 carries a fixed lever 111 at the left hand end, Figs. 1 and 2, and this lever has attached thereto a spring 112 connected to a hook 113 adjustably attached to an extension 114, Fig. 1. This spring moves the mechanism in opposition to the movements imparted by means of the butts through the lever 96 and returns the bluffer 89 to the position shown in Fig. 5 whenever follower 97 drops from one of the butts 91. To change a pattern it is only necessary for the operator to loosen up the screw 105 and to turn the knurled head of screw 101 until the follower 97 engages with the desired one of the discs; thereafter the pattern will be produced in accordance with the arrangement of butts on that particular disc.

The sleeve 93 extending from the element 37 has a shoulder or abutment 115 against which the hub 92, etc., bears and against which it is free to turn as restrained by a friction element to be described. A friction device containing plungers 116, spring pressed against the ends of hub 92, is attached to the end of sleeve 93 and is prevented from turning by engagement of suitable set screws or the like. This friction element includes the arms 117, bosses 118 within which the plungers and springs are retained, and a hub 119. A washer 120 is attached to the end of the shaft 35 by means of screw 121 and merely serves to cover up the end of shaft 35 as it turns within the sleeve 93, etc. The plungers 116 bear against the end of hub 92 and press that hub against the shoulder 115 so that there is a frictional resistance set up to the rotation of the hub, discs and ratchet wheel 94. The pawl 54 will move these pattern discs at certain times while the friction will prevent any overthrow or unintended movement thereof.

Now referring to Figs. 1 and 7–12, we will describe the operation of the binder and cutter as it functions during horizontal striping. The binder itself is not different from that usually employed on Banner machines and includes a bracket 122 attached to the latch ring 2, a plate 123, cutter 124 and a binder 125, the functions of which are well known and are thoroughly described in Patent 1,702,608. The lever 126 pivoted at 127 on the bracket 122 functions to control the opening and closing of the binder and the cutter, this lever being engaged by a connection 128 at the upper end of an upstanding rod 129. The rod 129 is guided as it passes through a hole in a guiding element 130 attached to the latch ring post 3. This rod 129 is connected to one end of a lever 131 mounted to pivot on a bracket 132 attached to the base. The other end of the lever has a second rod 133 pivoted thereto, this rod 133 being attached at its other end to be operated in the usual way from a lever which in turn bears upon one of the cam drums at the base of the machine. The operation of the binder and cutter is controlled from this cam drum and through the mechanism just described for all of the usual functions throughout the knitting of a stocking such as in yarn changes at the welt, high splice, heel and toe, or at any other of the usual changes which it is customary to make while knitting hosiery. Obviously any control of the binder and cutter for the striping yarns must be taken from a source of movement which may operate more frequently and with greater selectivity than is possible from the main cam drum. It is also necessary with the invention herein described to provide a binder and cutter which will operate at the striping yarn changes as they are governed by any one of the patterns on any one of the nineteen discs. To provide such a movement we have arranged an auxiliary control for the binder and cutter which functions at every course throughout the knitting of striped portions of the fabric except as governed by the pattern mechanism. In other words the binder and cutter is capable of operating at every course and if yarn changes should be made at every course, the said binder and cutter would function as often as the changes are made. However, since the control is derived from the yarn change mechanism as it controls the feeding fingers, changes will occur at only such times as a yarn is actually substituted for one of the other striping yarns.

Figures 10, 11, 12:
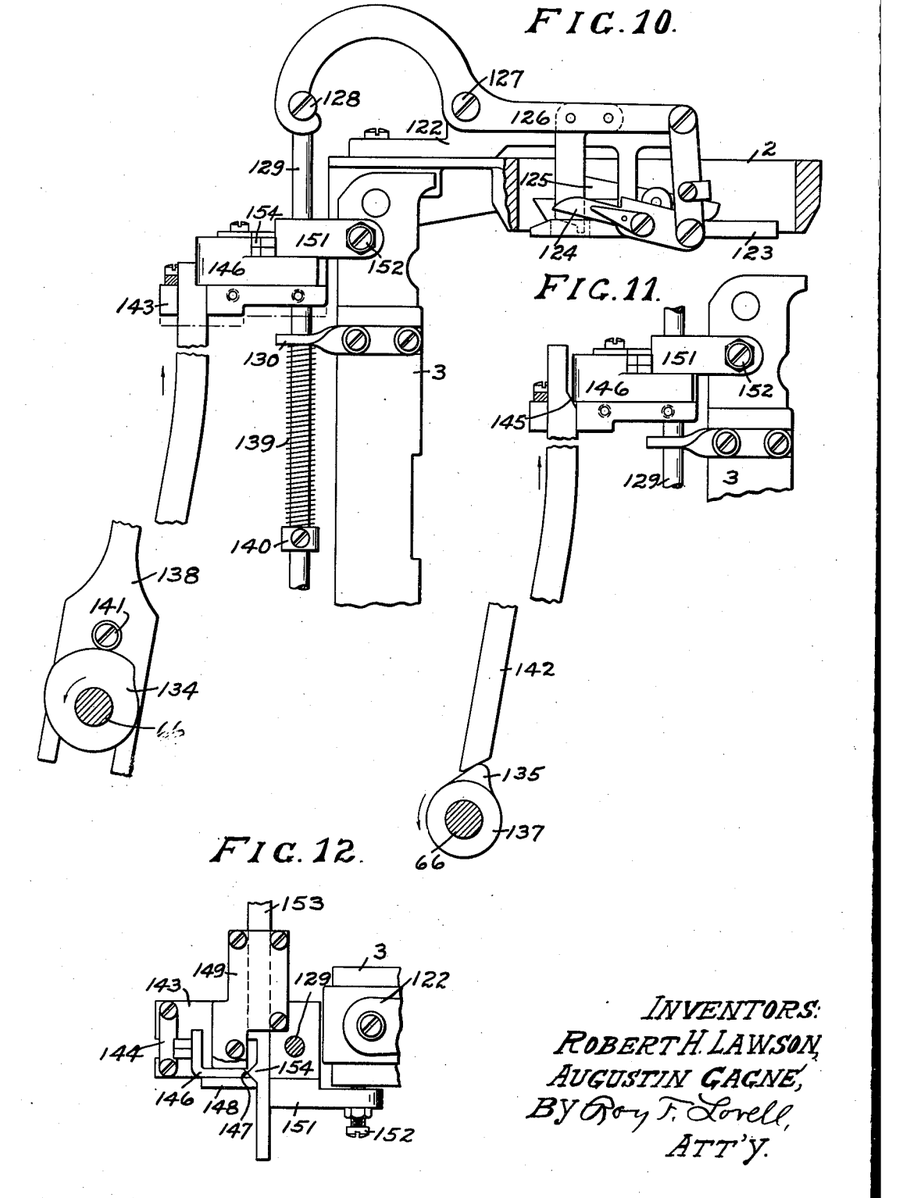
Fig. 10 is a section showing the binder and cutter and the controlling mechanism therefor to a larger scale.
Fig. 11 is a similar view showing part of this controlling mechanism in greater detail.
Fig. 12 is a detail plan view showing other parts of the binder controlling means and the manner of operation.

Now referring to Figs. 9, 10 and 11, the shaft 66 projects through to the side of the frame and carries two cams 134 and 135. Cam 134 has a hub 136 by means of which it is fixed to the shaft while the cam 135 is attached to the said shaft by means of a set screw passing through its hub 137. The first cam functions upon a rod or bar 138 which will be continuously reciprocated up and down to provide a source of movement by means of which the rod 129 will be moved upwardly to open the binder and cutter providing a yarn change is taking place. Return movements of the binder and cutter are always provided by means of a spring 139 under compression between the guide 130 and adjustable collar 140 fixed to the rod itself. The bar 138 has a roller or other type of follower 141 which bears on the cam 134 and is also forked as shown in Figs. 1, 7, 9 and 10 so that the lower end will be guided by the hub 136.

The second cam 135 functions to impart movements to a bar 142 which is somewhat similar to the bar 138 but is employed to set a mechanism hereinafter to be described for selection at each rotation of the cylinder. Both of these bars 138 and 142 are identical in cross-section and pass through a slot in block 143 which is permanently fixed to the rod 129. This slot is closed by means of a small piece 144 which is detachably connected to the block. The bar 138 is notched at its upper end as shown in Fig. 10 to provide a shoulder on which the entire mechanism will be lifted in the event the binder and cutter are to be operated. The bar 142 is provided with a beveled notch 145, the function of this notch being to reset a floating, selecting element 146 at each rotation of the cylinder. The function of this floating piece 146 which is formed as a right angled element with a beveled and shouldered part 147, is to lift the rod 129 in the event the binder and cutter are to be operated.

This said floating selecting element will be positioned as shown in Fig. 10 to be engaged within the right angled notch at the upper end of bar 138. This floating piece is held in position by a front plate 148 and by a top plate or cap 149. The front plate is removed, Figs. 10 and 11, and the cap is shown cut away in Fig. 12, however, this floating piece, is obviously free to slide inwardly or outwardly as shown in Figs. 10 and 11, but is constrained from moving in a vertical direction so that movements imparted to the floating element by means of bar 138 will result in a corresponding vertical elevation of the block 143 and of the rod 129 to which the block is fixed by means of a set screw 150, Fig. 1. An extension 151 has an adjustable screw 152 threaded therethrough and bearing against the side of the latch ring post to guide the movements of the block and to prevent any tendency of the rod 129 and attached parts to rotate as they might under the influence of the selecting devices which function upon the floating selector 146.

Figure 8:
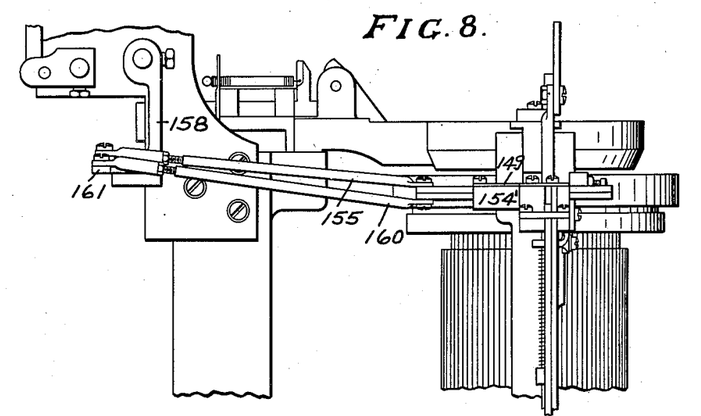
Fig. 8 is an elevation taken at the back of the machine to show such linkage as is provided for specially manipulating the binder and cutter.

Assuming that said floating selector has been moved outwardly to the position of Fig. 10 and under the influence of cam 134 and bar 138 has functioned to operate the cutter and binder, the bar 142 will thereafter be moved upwardly by cam 135 and the beveled edge 145 will then function to push said floating piece inwardly to an inoperative position, that is, a little farther than shown in Fig. 11. In such position both the bars 138 and 142 will continue to be reciprocated up and down during each rotation of the machine, but the binder and cutter will not be operated until another yarn change at which time one of two slides 153 will be moved so as to cam the floating piece 146 outwardly again, this caming action being the result of contact by a beveled projection 154 on the slide. Both of these slides are identical and function one above the other in a horizontal slot beneath the plate or cap 149. The block 143 is extended outwardly as shown in Fig. 8 at 154' and the cap likewise extends in that direction to provide an elongated slot of sufficient extent properly to guide these sliding elements.

Figure 7:
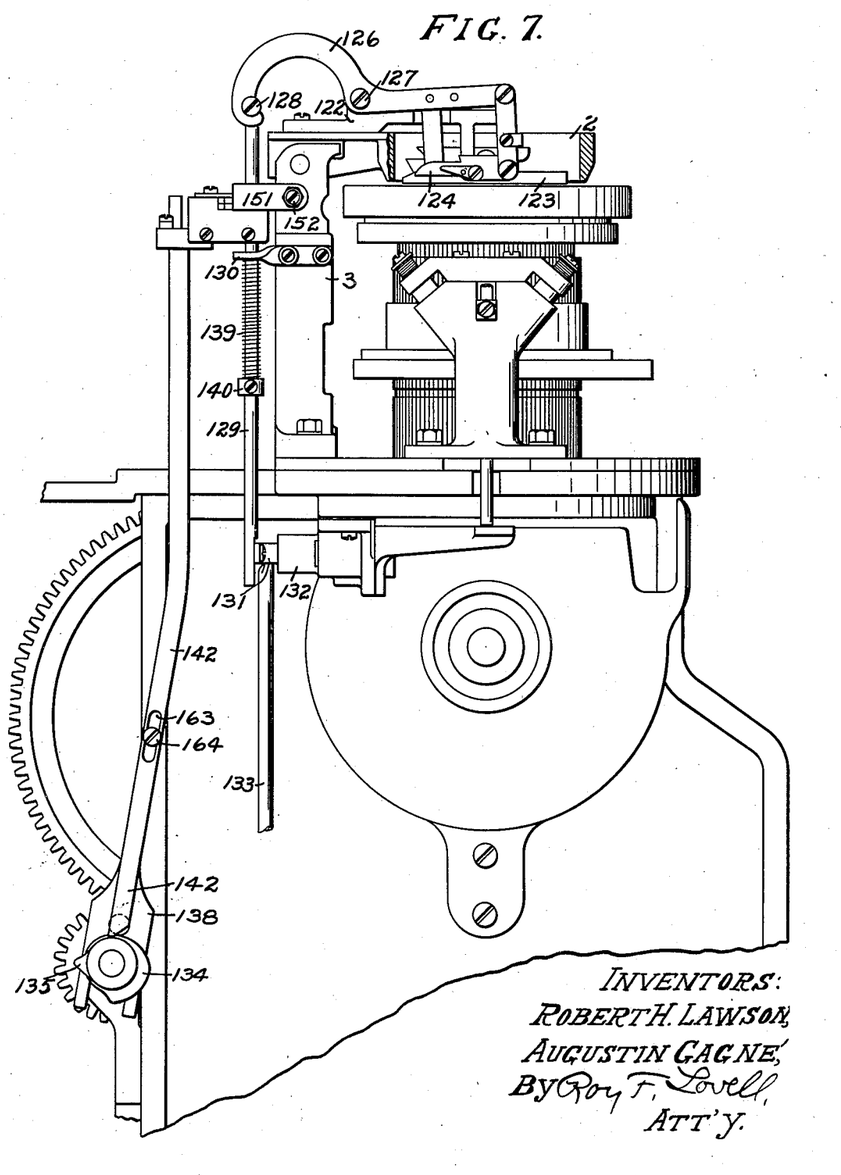
Fig. 7 is a side elevation, the latch ring being shown in section, to illustrate the general layout of the yarn binder and cutter and the controlling mechanism for the same.

The upper slide is connected by means of a link 155 to a lever 156 pivoted at 157 in a downwardly projecting support 158. The other end of said lever 156 is connected by a short link 159 to the lower end of yarn guiding finger actuating lever 23. The other lower slide is connected by a similar link 160 to lever 161 which is in turn pivoted at 157 and connected by a short link 162 to the lower end of companion lever 21. As the levers 21 and 23 are moved to either of their extreme positions they will cause the beveled projections 154 to move past the end 147 of the floating selector element and will push it out to the position shown in Figs. 10 and 12. In that position the binder and cutter will be caused to operate. The timing is such that the movement of one of the levers into position just before the feeding lever is moved from position will set this floating piece 146 whereupon cam 134 will immediately move bar 138 up to operate the binder and cutter which will open just in time to take in the yarn which is being withdrawn and to cut it. Of course the new yarn being taken may be withdrawn from the binder prior to this and before the binder is opened. As shown in Fig. 7 the timing of cams 134 and 135 is such that before the cam 134 could make a complete revolution and could again operate the binder and cutter, the cam 135 will have pushed the floating piece inwardly by means of bar 142 and it would be necessary to impart another selection and thus necessary to make another yarn change before the binder and cutter can be affected.

Lever 22 is not necessarily connected up to have any effect on this selecting means to operate the binder and cutter since one lever is never operated without the operation of at least one of the other levers, that is, whenever one of the levers functions to withdraw a finger it is always necessary to move another finger to yarn feeding position just before that finger is withdrawn. Thus one of the levers 21 and 23 always moves when lever 22 moves so that it is impossible to have any yarn change without affecting the floating selector element and without causing the binder and cutter to be operated. Of course, if the finger controlled by lever 22 is the one which is moved to a yarn feeding position, then the binder control is not initiated until the other lever moves from the feeding position, however, the time interval is so slight between these movements that the timing is as satisfactory in one instance as in the other. Actual operation of the binder functions from the cam 134 and it is only necessary to set the floating element 146 prior to upward movement of the bar 138.

The bar 142 is guided at its lower end by a slot 163 cut in the bar which slot engages about a shouldered screw 164 threaded into the other bar 138 which is directly in line therewith.

It can be seen that the binder and cutter control may function at each course, if yarn changes take place as often as that, or will function at every time a yarn change does take place. The control is from such a part of the mechanism that no matter from which one of the nineteen pattern determining discs the pattern is being taken, movements of the binder and cutter will always function in perfect synchronism with the changes of the yarn levers and will thus be controlled automatically for all possible patterns which may be knitted.

Now referring to Figs. 13-17 we will describe a modification or improvement applicable to the first and primary form of the invention disclosed, and which will greatly increase the pattern possibilities thereof. In the primary form of the invention just disclosed the discs generally indicated at 90 are ratcheted throughout a space of one tooth of the ratchet wheel, that is, one butt on the discs, for each rotation of the needle cylinder of the machine. It is thus impossible with the primary form of the invention to knit variations in stripes which will include other than a number of courses to make up the number 48. Of course, other variations are possible by changing the number of butts on the discs, but whatever that number might be, pattern possibilities are limited to stripes having a number of courses which would eventually go to make up the number of butt positions on a disc encountered during one revolution; on the second revolution of the discs 90 the machine would necessarily repeat what had been done on the previous cycle. For instance if the pattern on one of the discs 90 which was in use had all but one of the butts broken off, the machine would make just one change in every 48 courses. In other words, the pawl 47 would be allowed to ratchet the wheel 39 throughout a distance of one single tooth and that single color change could occur in any particular course included and would be followed by another color change 48 courses later as the same butt came around to remove the bluffer plate 89 from the front of the pawl 47 a second time. Another example might be that of breaking butts from a disc 90 so that every eighth butt would be left on. In this event a color change would occur every eight courses and the three colors being knitted would be repeated twice in each 48 courses. In this case every 48 courses would be an exact repeat of the previous in both the number of courses between changes and also as to the particular color being knitted in each consecutive group of eight courses.

The modification shown in these Figs. 13-17 provides for selective movements of the pattern discs 90 so that the knitter may have available practically unlimited possibilities as to the length of stripe and frequency within which changes may be made. The sleeve 93 is lengthed as shown at 93' and in addition to the discs 90 ratchet wheel 94, friction element 117, etc., a pattern disc 165 having 48 butts is connected to a ratchet wheel 166 having 48 teeth, both of these elements being freely rotatable upon the said sleeve. A spacing washer 167 is also loosely carried on the sleeve but has a projecting lug 168 which strikes against a shaft 169 to prevent rotation thereof. This washer bears between the hub 92 and against the side of disc 165 so that movements imparted to either one of the elements will not be frictionally transferred to the other. A second and similar ratchet wheel 170 is freely rotatable on sleeve 93' and has a series of pins 171 arranged about and adjacent its periphery. In this case there are 48 teeth on the ratchet wheel and 24 pins possible of being threaded thereinto, however, the number of pins may be varied in accordance with pattern requirements. All the pins are shown in place as well as all the butts being shown on disc 165, but of course, it is to be understood that some of the butts will be broken away and that some of the pins will be removed to effect whatever pattern it is desired to produce. A second washer 172 having a projection 173 is interposed between the ratchet wheels 166 and 170 for a purpose similar to that attributed to washer 167. In this particular form of the invention the plungers on the friction element bear against the side of the ratchet wheel 170 and the effect produced is the same, that is, the discs 90, the single disc 165 or ratchet 170 and the attached pins may be rotated without interference between each other.

Figures 6, 16, 17:
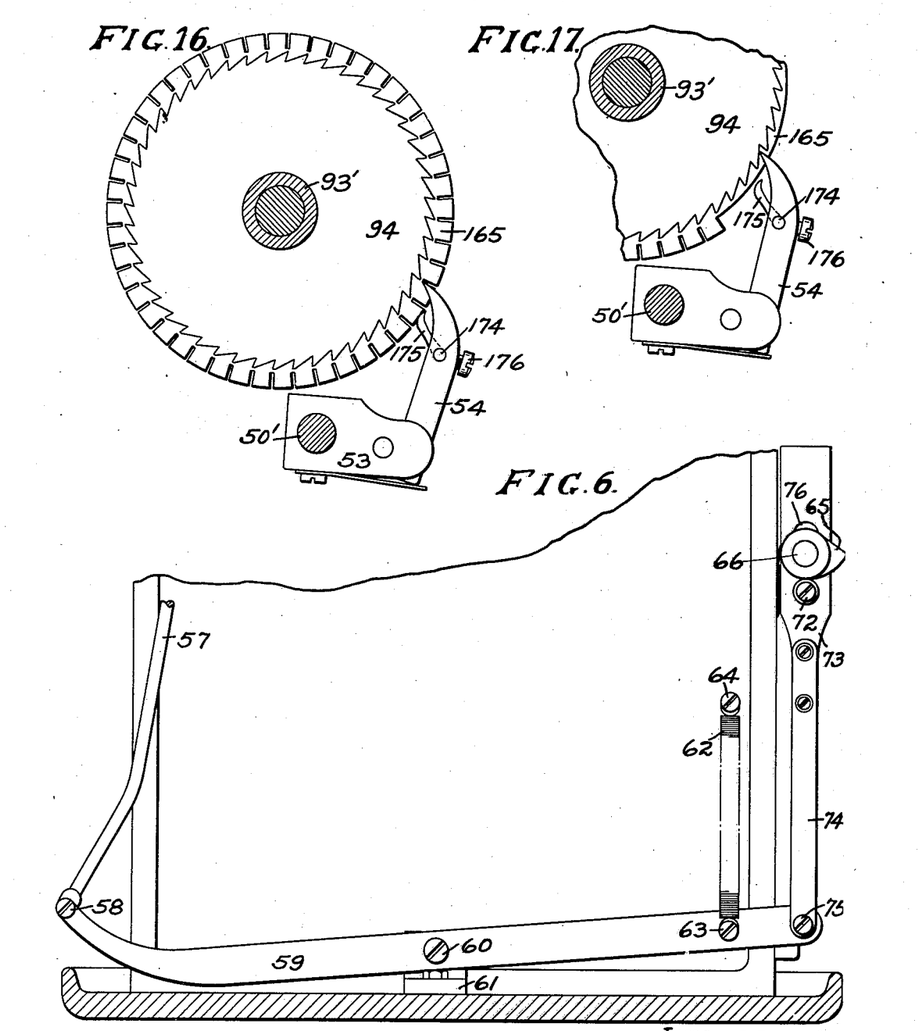
Fig. 6 is a section taken at the side of the machine and showing the operating devices for imparting movement to the striper ratcheting pawls.
Figs. 16 and 17 are detail views of one part of the additional striping control of Figs. 13-15.

The ratchet wheel 94 is to be moved by means of the same pawl 54, but that pawl now is to be provided with an extension 174 having a toe portion 175 which bears upon the single disc 165, or upon the butts thereon as will be illustrated. The extension 174 is adjustable and is secured in position by means of a set screw 176. Whenever the toe of the extension rides upon a butt on the disc 165 the ratchet 54 will be withdrawn from engagement with the teeth of its respective ratchet wheel; thus it is provided that the racking of the discs 90 may be controlled according to the disposal of butts on disc 165. In Figs. 16 and 17 the two positions of the pawl 54 are shown and the discs at 90 have been omitted to illustrate the disposal of butts on disc 165 which would otherwise be hidden in a view of this sort.

Figure 13:
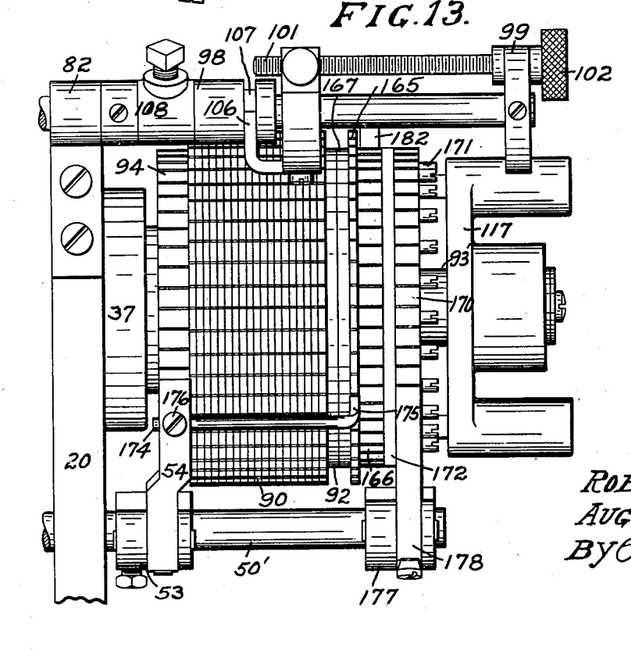
Fig. 13 is an elevation showing special additional pattern determining means which are applied to a simple striper control of Fig. 1, etc.
Figure 14:
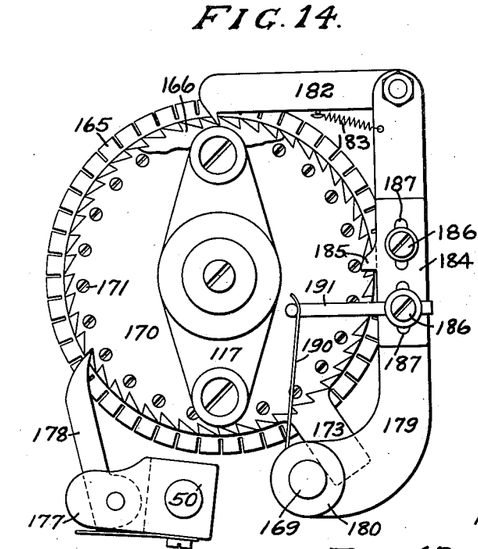
Fig. 14 is an elevation of the mechanism of Fig. 13 as seen from the right hand end thereof.

The spindle 50 has been extended in this particular instance as illustrated at 50' and carries a second arm 177 and a pawl 178, the construction of which will be apparent from an inspection of Figs. 13 and 14. This pawl is continuously moved one stroke for each rotation of the needle cylinder and racks the ratchet wheel 170 one tooth for each such revolution.

Figure 15:
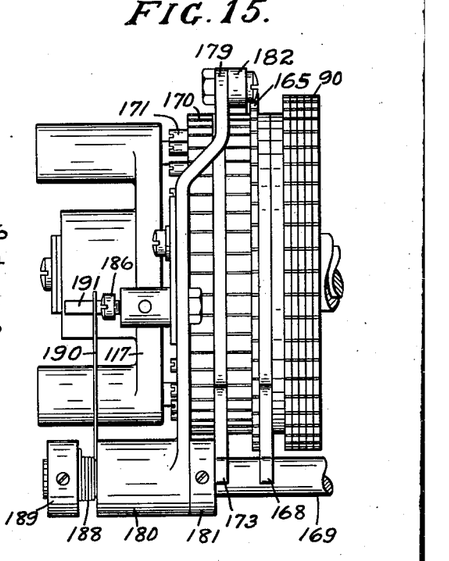
Fig. 15 is an elevation of such mechanism as is shown in Fig. 13, but the view is taken from the opposite side.

Now referring to Figs. 14 and 15, the projecting stud or spindle 169 has an angular lever 179 pivoted upon hub 180. The collar 181 positions the lever which is offset at its upper end and has pivoted thereto a pawl 182 which engages the teeth on the ratchet wheel 166. This pawl is maintained in engagement with those teeth by a spring 183. Adjacent the central part of said lever 179 we have adjustably fixed a plate 184 carrying a pin engaging follower 185 for contacting the pins 171. This plate 184 is held in position by screws 186 engaging within slots 187 so that vertical adjustments may be effected to get proper timing of the ratcheting movement. A coil spring 188 is held about the stud 169 and has one end fixed to collar 189, the other end extending upwardly at 190 to engage the bent end of a projecting hook 191 connected as shown to the lever 179. This spring moves the lever to the left, Fig. 14, so that the pawl engages a tooth of ratchet wheel 166 as the follower 185 drops from one of the pins. Upon being engaged by another pin the lever will be moved and ratchet wheel 166 will incidentally be racked throughout the distance of a single tooth.

According to the disposal of pins 171 it is possible to vary the movement of the single disc 165 and according to the layout of butts on that disc and its periodic movements, the pawl 54 will be caused to ratchet the series of discs 90 in almost any desired manner. By these three variable pattern means functioning simultaneously, the control of yarn feeding levers will be affected in accordance with desired variations in the pattern which it is proposed to knit. Likewise, for changes of pattern the follower 97 may be moved from one to the other of the discs in the group 90, other discs with a different arrangement of butts may be substituted for the disc 165, and in addition, the disposal of pins 171 may be varied as desired or as necessary to effect the knitting of stripes of different lengths, different sequences of color, and of continuously varying lengthed stripes of the same color, at the same time by the mechanism previously described, the control of the yarn binder and cutter will be varied automatically with changes of pattern.

Operation

Figures 18, 22, 23, 24:
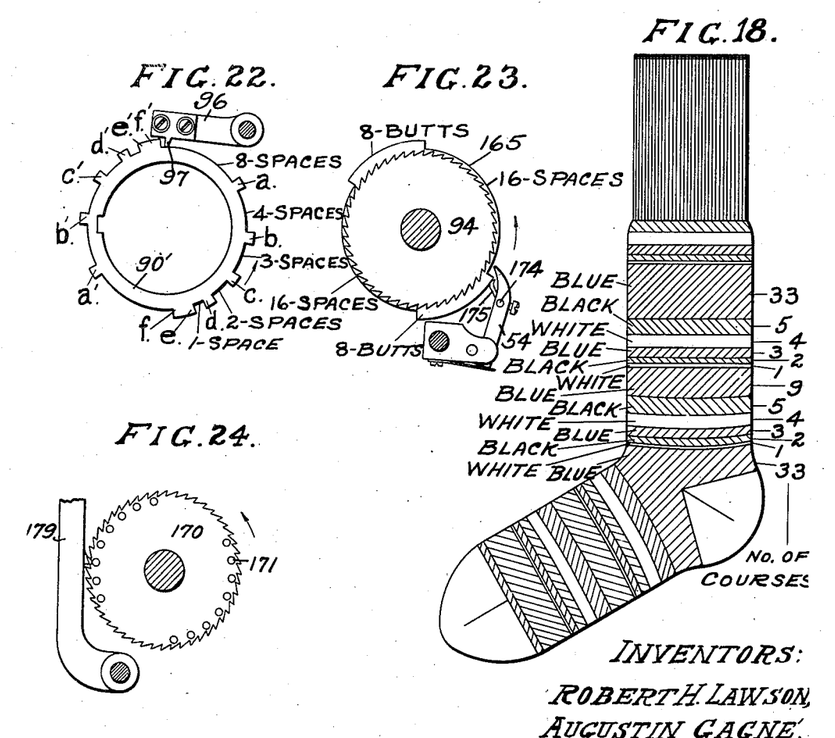
Fig. 18 is a diagrammatic view showing a half hose as ornamented by an intricate, horizontally striped pattern, the set up for this pattern being shown in Figs. 19-24.
Fig. 22 shows one of the selector discs which functions to control the movements of those cams represented in Figs. 19-21.
Fig. 23 shows an intermediate control for selective movements of the disc shown in Fig. 22.
Fig. 24 shows a particular primary pattern means for determining the ratcheting movements of the pattern disc which is shown in Fig. 23.

Now referring to Figs. 18–24, we will describe the operation of the horizontal striper while knitting a pattern such as illustrated in the stocking in Fig. 18. In this particular stocking there are a great many stripes of different widths and having three colors, blue, black and white knitted throughout in sequence. For convenience we will start with the widest stripe which is knitted blue and has 33 courses. Then, in sequence, other stripes follow having respectively the following colors and numbers of courses: black 5 courses; white 4 courses; blue 3 courses; black 2 courses; white 1 course; blue 9 courses; black 5 courses; white 4 courses; blue 3 courses; black 2 courses and finally, white in a single course. This pattern is repeated as long as desired.

Figure 19:
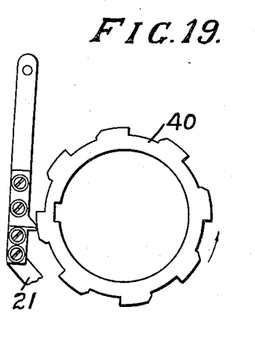
Figs. 19-21 show simultaneous positions of three striping lever control cams and the intermediate levers which convey motion from these cams to the levers themselves.
Figure 20:
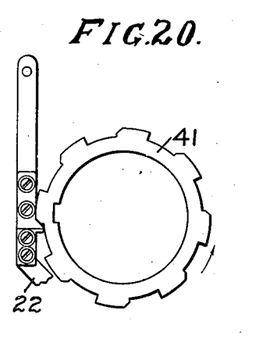
Figure 21:
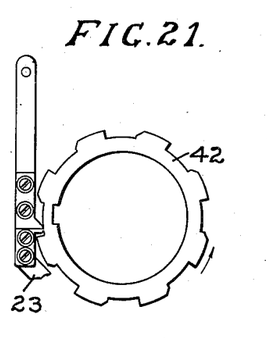

In Figs. 19, 20 and 21 the discs 40, 41 and 42 are shown individually in the relationship which they occupy at yarn change as the yarn finger controlling lever 21 is held up on a cam on the plate 40. These plates 40, 41 and 42 are shown in a position which they occupy as the movement under the action of pawl 47 is not quite completed. The lever 21, as aforesaid, is held up on a cam and the follower on that lever is at about the midpoint on the cam; this lever was raised on the previous change and is merely being held up prior to dropping in on some subsequent change. The plate 41 is acting throughout one of its cams to swing the lever 22 so as to raise a cooperating yarn guiding finger out of action. The position herein occupied is one which the lever assumes just prior to being moved up on the cam and the delay in moving this lever after the adjacent lever 23 has dropped as shown in Fig. 21, provides for a slight overlap between the incoming and outgoing yarn. The plate 42 has moved to a position wherein lever 23 has swung to a position to allow its yarn guiding finger to drop to feeding position. It can be seen that the follower on lever 23 has dropped from a cam before the follower on lever 22 is to be raised.

The parts of the striper controlling pattern mechanism shown in Figs. 22–24 have all been illustrated in such a position as they would occupy just at the start of knitting the wide stripe of 33 courses. In other words, the single white course has been knitted and the change has been effected to start the knitting of this 33 course stripe. The follower 97 on lever 96 has just dropped from a butt on the disc 90' so that the bluffer plate has been moved up under pawl 47, Fig. 5, to prevent any further ratcheting of the discs 40—42 until that follower 97 is again raised by a butt on the disc 90'.

The disc 165, Fig. 23, has an arrangement of eight butts on either side which are separated by spaces wherein sixteen butts have been broken away. The eight butts have been shown as a single long butt merely for purposes of convenience and to avoid complication of the drawings. It is thought better to label the number of spaces of butts rather than to burden the reader with counting them each time. Just as the mechanism of Fig. 22 moved to the position illustrated, the pawl 54 was swung away from ratchet wheel 94 as the toe 175 of the extension 174 was raised by the first one of the lower group of eight butts. This means that the pawl 54 will not start to ratchet the wheel 94 and consequently the group of 19 discs until the disc 165 has been moved through eight spaces of butts.

The ratchet wheel 170 is provided with eight pins 171 symmetrically spaced, thus leaving a space of four centers of pins between the groups. The pins are spaced two ratchet teeth apart within the group so that it takes two ratcheting movements or two courses of knitting on the machine to move throughout the space between centers of adjacent pins. The lever 179 which controls the ratcheting of disc 165 has just been moved out by the third pin in the top group of pins, and it is that same movement which moved the disc 165 to the position shown in Fig. 23, thereby lifting pawl 54 away from its ratchet wheel just after the follower 97 fell from the double butt on disc 90'. As before stated, the ratchet wheel 170 is moved one tooth at each course of knitting and in the direction shown by the arrow, Fig. 24. It takes ten courses to move that wheel throughout the remaining five pins in the topmost group; those five pins at the same time imparting five distinct ratcheting movements through the lever 179 and pawl 182 to move ratchet wheel 166 five spaces or throughout five butts. Then throughout the eight courses it takes to ratchet the wheel 170 throughout the four spaces between the group of pins, there are no movements imparted to disc 165. There are three more butts to go on that disc 165 before the pawl 54 can drop and thus it is necessary to ratchet the wheel 170 six more courses or throughout the first three pins in the bottom group as shown, whereupon the pawl 54 will again engage the ratchet wheel 94 to start movements of the group of nineteen discs of which 90' is the particular one in use as we are describing the knitting of this particular pattern. Up to the time this group of discs 90 starts to move, there have been the sum of 10 plus 8 plus 6 or 24 courses, whereupon the pawl 54 will then start to ratchet wheel 94 to move disc 90'. There are eight spaces through which that disc must be moved before the butt $a$ is encountered at which time the follower 97 will be ratcheted to withdraw the bluffer from the pawl 47 to allow the pawl to engage the ratchet wheel 39 and bring about a yarn change all as have been previously described. This makes it necessary for pawl 54 to be moved nine times or for nine courses more to be knitted of the same color, blue, prior to the change and this totals 24 plus 9 or the 33 courses in the wide stripe.

The following movement of pawl 54 will cause the butt $a$ to move from under follower 97 and the bluffer 89 will move back under pawl 47. Now the follower 175 is resting on disc 165 and will not engage any butts thereon throughout 16 spaces.

Of course the disc 165 will be moved only as lever 179 is rocked under influence of pins on ratchet wheel 170. That ratchet wheel is moved one tooth for every course and must be moved throughout a sufficient number of courses to bring 16 pins into action before the opposite group of eight butts on discs 165 will be in a position to raise the pawl 54 away from the wheel 94. The timing is such that it will take 39 courses of knitting to bring the disc 165 to that position all as will be explained more fully hereinafter. During that 39 courses the remaining stripes are to be knitted with pawl 54 racking the group of nineteen discs one space for every course and with the butts on the disc 90' causing yarn changes at frequent intervals.

The black stripe having five courses will be knitted as butt a moves out from under follower 97 and the disc moves through the four spaces following and up on to the butt b. Then a change takes place and the white yarn will be knitted as disc 90' moves throughout three spaces and up on to butt c, a total of four white courses. Next a yarn change will be made under the influence of butt c to return to the blue yarn for three courses. This will be effected by movements throughout the two spaces following butt c and up butt d. Butt d will effect a change to black throughout the one space following and as follower 97 moves up onto butt e—two courses. These double butts e and f cause two yarn changes, one to white for a single course, that is, as the follower moves from e to f, and thereafter a change back to the blue as the follower 97 drops off butt f.

Next the disc 90' moves through eight courses and up on to butt a' knitting 9 courses of blue. The knitting then follows throughout a repeat of the 5 courses of black; 4 courses white; 3 courses blue; 2 courses black and a single course of white. The butts a', b', c', d', e', and f' are all similar and are spaced throughout the same distances as the butts a–f just described. At this time if follower 97 drops from the butt f', all parts are in a position to start the wide stripe and repeat the entire pattern.

These courses knitted after the wide stripe and including the last single course of white total 39 and during the knitting of these 39 courses, the ratchet wheel 170 will be moved throughout 39 courses, however, before the start of knitting the first black stripe of 5 courses, that wheel was moved 9 courses to knit the last part of the wide stripe. This gives a total of 39 plus 9 or 48 courses which brings the mechanism back so that at the start of knitting the next wide stripe, lever 179 is moved as shown in Fig. 24 but the third pin is in the opposite group from that which we started with in the knitting of the first 33 course stripe. It will be noted that the movement throughout these 48 courses after the follower 175 dropped from the group of eight butts on disc 165 would bring into action all the sixteen pins on disc 170 and thus ratchet the disc 165 throughout the necessary sixteen spaces to bring the opposite eight butts into play at the start of knitting the repeat.

This description comprises one example of a pattern and its formation which is not particularly complicated as knitted with the complete mechanism herein described; but it would be practically impossible with any simple striper mechanism previously known. Of course, other patterns will be made by a change of pins on the wheel 170, by a change of butts on disc 165 or a similar disc to replace that, and by shifting from one of the discs in the group 90 or changing to a disc with different arrangements of butts disposed thereon. What has been described should serve to illustrate the function of the mechanism and the advantages attendant upon its use. Any pattern which it is desired to knit may be set up as described, and it will not be necessary for the knitter to concern himself about setting a pattern for operating the yarn binder and cutter since their movements will automatically follow any change of movements imparted to the yarn feeding levers.

The principles as herein described are particularly advantageous when used with yarn changing mechanism for horizontal striping but are not limited thereto except as indicated by the appended claims. The binder control has been described relative to its function with yarn change for horizontal striping, but it is contemplated to employ the principles of that part of the invention for any convenient purposes to which it may be applied and the scope of the invention is not to be considered limited other than by the claims.

We claim:

1. A knitting machine having in combination yarn feeding means, cam means individual to each yarn feeding means for effecting changes in the position of said feeding means to change from one feeding yarn to another as for horizontal striping, means for advancing said cam means through different positions to effect the control of said feeding means, pattern means associated with said cam means, said cam and pattern means being mounted on a common shaft, and means between said pattern means and the cam advancing means to determine the effect thereof on said cam means.

2. A knitting machine having in combination a plurality of yarn feeding fingers for feeding yarns as in horizontal striping, cam means individual to each yarn feeding means and a pawl reciprocable to engage a ratchet wheel rotatable with said cam means whereby the cams may be advanced to effect changes of the feeding yarns, two separate pattern means associated with said cam and feeding means and rotatable on a shaft common to both, and other means between said pattern means and cam means, functioning upon the pawl to determine its action for periodically advancing said cam means.

3. A knitting machine having in combination yarn feeding means for feeding a plurality of yarns, cam means for imparting selective movements to said feeding means, means for periodically moving said cam means and pattern means for controlling said last mentioned means including a plurality of pattern discs having pattern determining formations thereon, means between said pattern means and cam actuating means for imparting selections from the pattern means to the actuating means, and a second pattern means for imparting selective movements to said first mentioned pattern means.

4. In a knitting machine the combination of a plurality of yarn feeding fingers, cams functioning to impart feeding movements to said fingers, ratcheting means for periodically advancing said cams and means for rendering said operating means inoperative including a series of pattern devices, one said pattern device being directly operable to control said means for rendering the ratcheting means inoperative and the others of said patterning devices being constructed and arranged so as to modify the patterning movements of said first mentioned patterning means.

5. In a knitting machine, the combination of yarn feeding means and cam means for imparting movements of the feeding means to and from feeding position, a pawl and ratchet for actuating said cams and a bluffer plate movable to and from a position beneath said pawl, a pattern drum having a plurality of pattern elements thereon, a follower engageable with pattern determining projections on one of said pattern elements and connecting means for imparting the movements of said follower as affected by the pattern element to the bluffer plate for the purpose described.

6. Mechanism as defined in claim 5, wherein said follower is manually movable for selective engagement with one of several distinct pattern elements on said drum.

7. A device as claimed in claim 5, wherein said pattern elements comprise discs provided with a plurality of removable butts.

8. In a knitting machine the combination of a plurality of yarn feeding fingers, means for imparting yarn changing movements to these fingers, pattern means for controlling the actuation of said last mentioned means, a binder and cutter for the yarn and means constantly reciprocating and functioning to provide impulses whereby said binder and cutter may be caused to operate once during each course of knitting, a movable element engageable with said means for imparting impulses to the binder and cutter and for rendering those impulses effective to actuate the same, and selecting means for this last mentioned means operable when and only when a yarn change is effected.

9. A binder and cutter for a knitting machine and operating means therefor including a constantly reciprocating element for imparting periodic impulses to actuate the binder and cutter, a movable element whereby said impulses may or may not be transferred through to the said binder and cutter, and positioning means to set this movable element in a position whereby the impulses may or may not be imparted in accordance with a predetermined pattern.

10. A yarn binder and cutter for knitting machines and means for actuating said binder and cutter including a constantly reciprocating element movable at each course for imparting impulses which may cause actuation of the binder and cutter, a movable element connected for actuation of the binder and cutter, means for positioning said movable element out of the path of said impulse means and other selecting elements for positioning it in the path of said impulse means if the binder and cutter are to be actuated.

11. In a knitting machine a plurality of yarn feeding fingers and actuating means whereby said fingers are to be moved to effect yarn changes, a binder and cutter for the yarns, a binder actuating means including connections for movement of the binder and cutter element and a constantly reciprocating element for imparting impulses which may be transmitted through to the binder and cutter actuating means, a movable element movable to and from positions to be engaged by said impulse means and constructed to impart those impulses to the binder and cutter actuating means if in that position, means for moving the said movable means to a position not to be engaged by said impulse means, and selecting means for repositioning the movable means in the path of the impulse means in accordance with movements of the yarn feeding fingers.

12. Mechanism as defined in claim 11, wherein said last mentioned selecting means is directly connected to that mechanism which functions to cause yarn changing movements of the yarn feeding fingers.

13. In a knitting machine the combination of a plurality of yarn feeding fingers movable to and from a feeding position, pattern means functioning on said fingers to move them to and from the feeding position, a binder and cutter for the yarns, impulse means continuously reciprocating and capable of actuating said clamp and cutter, and other means operable from the means for moving said fingers to connect said impulse means to the binder and cutter whereby the same will be actuated only when a yarn change is made.

14. A knitting machine having in combination means for feeding a plurality of yarns and means for controlling said feeding means to effect yarn changes as for horizontal striping, pattern means at a level relatively close to that of the yarn feeding means operable to effect yarn changes through means including slidable elements directly connected to said yarn feeding means and pivoted levers engageable with said slidable means, said pattern means including a plurality of separate pattern elements one of which determines the movements of said changing means and another of which controls advancing movements of said first mentioned pattern elements.

ROBERT H. LAWSON.
AUGUSTIN GAGNÉ.